(12) United States Patent
Hu et al.

(10) Patent No.: US 12,197,022 B2
(45) Date of Patent: Jan. 14, 2025

(54) ASSEMBLY ALIGNMENT STRUCTURE FOR OPTICAL COMPONENT

(71) Applicant: FOCI FIBER OPTIC COMMUNICATIONS, INC., Hsinchu (TW)

(72) Inventors: Ting-Ta Hu, Hsinchu (TW); Po-Yi Wu, Hsinchu (TW)

(73) Assignee: FOCI FIBER OPTIC COMMUNICATIONS, INC., Hsinchu (TW)

( * ) Notice: Subject to any disclaimer, the term of this patent is extended or adjusted under 35 U.S.C. 154(b) by 200 days.

(21) Appl. No.: 17/975,770

(22) Filed: Oct. 28, 2022

(65) Prior Publication Data
US 2024/0085645 A1 Mar. 14, 2024

(30) Foreign Application Priority Data
Sep. 14, 2022 (TW) .................. 111210030

(51) Int. Cl.
*G02B 6/42* (2006.01)
(52) U.S. Cl.
CPC ......... *G02B 6/4231* (2013.01); *G02B 6/4243* (2013.01); *G02B 6/4244* (2013.01); *G02B 6/4245* (2013.01); *G02B 6/4257* (2013.01)
(58) Field of Classification Search
CPC ..... G02B 6/4228; G02B 6/423; G02B 6/4231
See application file for complete search history.

(56) References Cited

U.S. PATENT DOCUMENTS

| | | | | | |
|---|---|---|---|---|---|
| 4,119,362 | A | * | 10/1978 | Holzman | G02B 6/32 385/74 |
| 5,123,073 | A | * | 6/1992 | Pimpinella | G02B 6/3885 385/59 |
| 5,179,609 | A | * | 1/1993 | Blonder | G02B 6/4224 385/89 |
| 5,757,999 | A | * | 5/1998 | Tabuchi | G02B 6/4231 385/35 |
| 6,866,426 | B1 | * | 3/2005 | Steinberg | G02B 6/423 385/83 |
| 8,300,998 | B2 | * | 10/2012 | Chang | G02B 6/32 385/33 |
| 9,229,169 | B2 | * | 1/2016 | Doany | H01L 21/302 |
| 9,575,267 | B1 | * | 2/2017 | Shastri | G02B 6/421 |

(Continued)

*Primary Examiner* — Michael Stahl
(74) *Attorney, Agent, or Firm* — Lin & Associates Intellectual Property, Inc.

(57) ABSTRACT

An assembly alignment structure for optical component includes an optical fiber, comprising: a combined fiber segment and a plurality of bare fiber segments; a cover plate, having a first installation surface disposed with a plurality of guide grooves, an installation groove, and at least one first coupling groove, the bare fiber segments being in the corresponding in the guide grooves; a lens, arranged in the installation groove; a chip, having a signal receiving surface; a carrier plate, having a second installation surface disposed with at least one second coupling groove, the chip being fixed on the second installation surface; and at least one positioning post; wherein when the cover plate and carrier plate are aligned, the positioning post is located in the first and second coupling grooves, and the optical fiber and the lens are fixed and aligned between the carrier plate and the cover plate.

8 Claims, 10 Drawing Sheets

(56) References Cited

U.S. PATENT DOCUMENTS

| | | | | |
|---|---|---|---|---|
| 2002/0031301 | A1* | 3/2002 | Sasaki | G02B 6/32 |
| | | | | 385/52 |
| 2003/0228109 | A1* | 12/2003 | Uekawa | G02B 6/423 |
| | | | | 385/33 |
| 2006/0233497 | A1* | 10/2006 | Hoshino | G02B 6/4201 |
| | | | | 385/88 |
| 2008/0008419 | A1* | 1/2008 | Krahenbuhl | G02B 6/32 |
| | | | | 385/33 |
| 2020/0209477 | A1* | 7/2020 | Shikama | G02B 6/3636 |
| 2023/0221509 | A1* | 7/2023 | Hu | G02B 6/423 |
| | | | | 385/33 |
| 2023/0251428 | A1* | 8/2023 | Schaevitz | G02B 6/423 |
| | | | | 385/33 |

\* cited by examiner

ASSEMBLY ALIGNMENT STRUCTURE FOR OPTICAL COMPONENT

BACKGROUND OF THE INVENTION

1. Field of the Invention

The present invention relates generally to an optical component, and more particularly, to an assembly alignment structure for optical component.

2. The Prior Arts

With the rapid development of the Internet and mobile communications, the demand for a large amount of data transmission has also arrived. However, the speed of data transmission through electronic signals seems to have reached a bottleneck. The backbone of data transmission uses optical signals to carry out data transmission is the trend of the future. Optical signal transmission components based on Silicon Optical Bench (SiOB) are also widely used in various products. In such products, the optical connection cost between two silicon chips or between the silicon chip and the optical fiber is usually much higher than the production cost of the silicon chip or the optical fiber itself, because it takes a long time to calibrate and align. For this reason, the silicon chip packaging alignment operation has gradually received attention, and various assembly alignment methods or structures have been derived To this end, a set of previously designed silicon chips invented by the inventor has both the chip's circuit and the coupling structure for alignment, so that the components can be quickly adjusted during the assembly process and the alignment and assembly operations can be quickly performed. However, the aforementioned method must use a silicon wafer with a larger area, and the material cost of such a silicon wafer is relatively high. Therefore, the inventor has designed a set of optical components assembly alignment structure with reduced cost and the more convenience of assembly.

SUMMARY OF THE INVENTION

A primary objective of the present invention is to provide an assembly alignment structure for optical component, which utilizes the cooperation of a cover plate, a carrier plate, and a positioning column, so that the components such as optical fibers and chips to be assembled can be quickly and accurately assembled and installed at the relative position of each component, and then the components are positioned relatively to each other during assembly, so as to shorten the calibration and alignment time, thereby improving the assembly time and efficiency, and reducing the production cost.

In order to achieve the aforementioned objective, the present invention is an assembly alignment structure for optical component, including: an optical fiber, a cover plate, a lens, a chip, a carrier plate, and at least one positioning post; the optical fiber includes a combined fiber segment and a plurality of bare fiber segments; the cover plate has a first installation surface, the first installation surface is disposed with a plurality of guide grooves, an installation groove, and at least one first coupling groove, the bare fiber segments are arranged in the corresponding in the guide grooves; the lens is arranged in the installation groove; the chip has a signal receiving surface; the carrier plate has a second installation surface, the second installation surface is disposed with at least one second coupling groove, the chip is fixed on the second installation surface; when the cover plate is aligned with the carrier plate, the positioning post is located in the first coupling groove and the second coupling groove, so that the optical fiber and the lens are accurately fixed between the carrier plate and the cover plate, and the optical signal of the optical fiber can be projected to the signal receiving surface through the lens.

In a preferred embodiment, the first coupling groove and the second coupling groove are at least one of a V-shaped groove or a U-shaped groove, and the positioning post is a cylinder.

An assembly alignment structure for optical component, comprising: an optical fiber, a cover plate, a lens, a chip, and a carrier plate; the optical fiber includes a combined fiber segment and a plurality of bare fiber segments; the cover plate has a first installation surface, the first installation surface is disposed with a plurality of guide grooves, an installation groove, and a plurality of first coupling portions, the bare fiber segments are arranged in the corresponding guide grooves; the lens is arranged in the installation groove; the chip has a signal receiving surface; the carrier plate has a second installation surface, the second installation surface is disposed with a plurality of second coupling portions, the chip is fixed on the second installation surface; when the cover plate is aligned and coupled to the second carrier plate, the first coupling portions and the second coupling portions are mutually coupled and positioned, so that the optical fiber and the lens are accurately fixed between the carrier plate and the cover plate, and the optical signal of the optical fiber can pass through the lens to be projected to the signal receiving surface.

In a preferred embodiment, when the first coupling portion forms an upwardly convex positioning protrusion on the surface of the cover plate, the second coupling portion forms a downwardly concave positioning groove on the surface of the carrier plate.

In a preferred embodiment, when the first coupling portion forms a downwardly concave positioning groove on the surface of the cover plate, the second coupling portion forms an upwardly convex positioning protrusion on the surface of the carrier plate.

In a preferred embodiment, the positioning protrusion has at least one inclined surface, and the positioning groove also has an inclined surface at a relative position.

In a preferred embodiment, the first installation surface forms a plurality of side-by-side recessed guide grooves in a middle part, and the first coupling portion is formed on both sides of the guide grooves.

In a preferred embodiment, the installation groove is a stepped groove, located at an axial end of the guide groove and adjacent to a vertical surface of one side of the first installation surface, and the installation groove has a pair of alignment planes, the first installation surface also has a plurality of alignment grooves, the alignment grooves are adjacent to a plurality of positions on both sides of the guide groove and communicate with the installation groove, and the alignment grooves are at least one of U-shaped or V-shaped groove.

In a preferred embodiment, the lens has a stripe shape and corresponds to a plurality of the bare fiber segments; an optical fiber passive alignment surface and an optical light-emitting surface are respectively formed on both sides of a vertical surface of the optical fiber, and the optical fiber passive alignment surface faces the bare fiber segment, the lens has an inlay and is located on the side of the optical light-emitting surface, the inlay is in contact with the alignment plane, and the lens also has a plurality of guide posts located on the side of the optical fiber passive alignment surface, and the guide posts are located in the alignment groove.

In a preferred embodiment, the alignment groove is at least one of U-shaped or V-shaped, and the guide post is partially arc-surfaced, and the arc surface is located in the alignment groove.

In a preferred embodiment, the second installation surface has an accommodating groove, the chip is located in the accommodating groove, the signal receiving surface of the chip faces upward, and the optical signal of the optical fiber passes through the optical light-emitting surface, and then is reflected downward and projected on the signal receiving surface.

In a preferred embodiment, the second installation surface has a plurality of position marks, the chip is fixed in the enclosing areas formed by the position marks, a vertical surface of the chip has the signal receiving surface, the optical signal of the optical fiber is directly projected on the signal receiving surface after being focused by the lens.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

The technical solutions of the present invention will be described clearly and completely below in conjunction with the specific embodiments and the accompanying drawings. It should be noted that when an element is referred to as being "mounted or fixed to" another element, it means that it can be directly on the other element or an intervening element may also be present. When an element is referred to as being "connected" to another element, it means that it can be directly connected to the other element or intervening elements may also be present. In the illustrated embodiment, the directions indicated up, down, left, right, front and back, etc. are relative, and are used to explain that the structures and movements of the various components in this case are relative. These representations are appropriate when the components are in the positions shown in the figures. However, if the description of the positions of elements changes, it is believed that these representations will change accordingly.

Unless otherwise defined, all technical and scientific terms used herein have the same meaning as commonly understood by one of ordinary skill in the art of the present invention. The terminology used herein is for the purpose of describing particular embodiments only and is not intended to limit the present invention. As used herein, the term "and/or" includes any and all combinations of one or more of the associated listed items.

Figure 1:
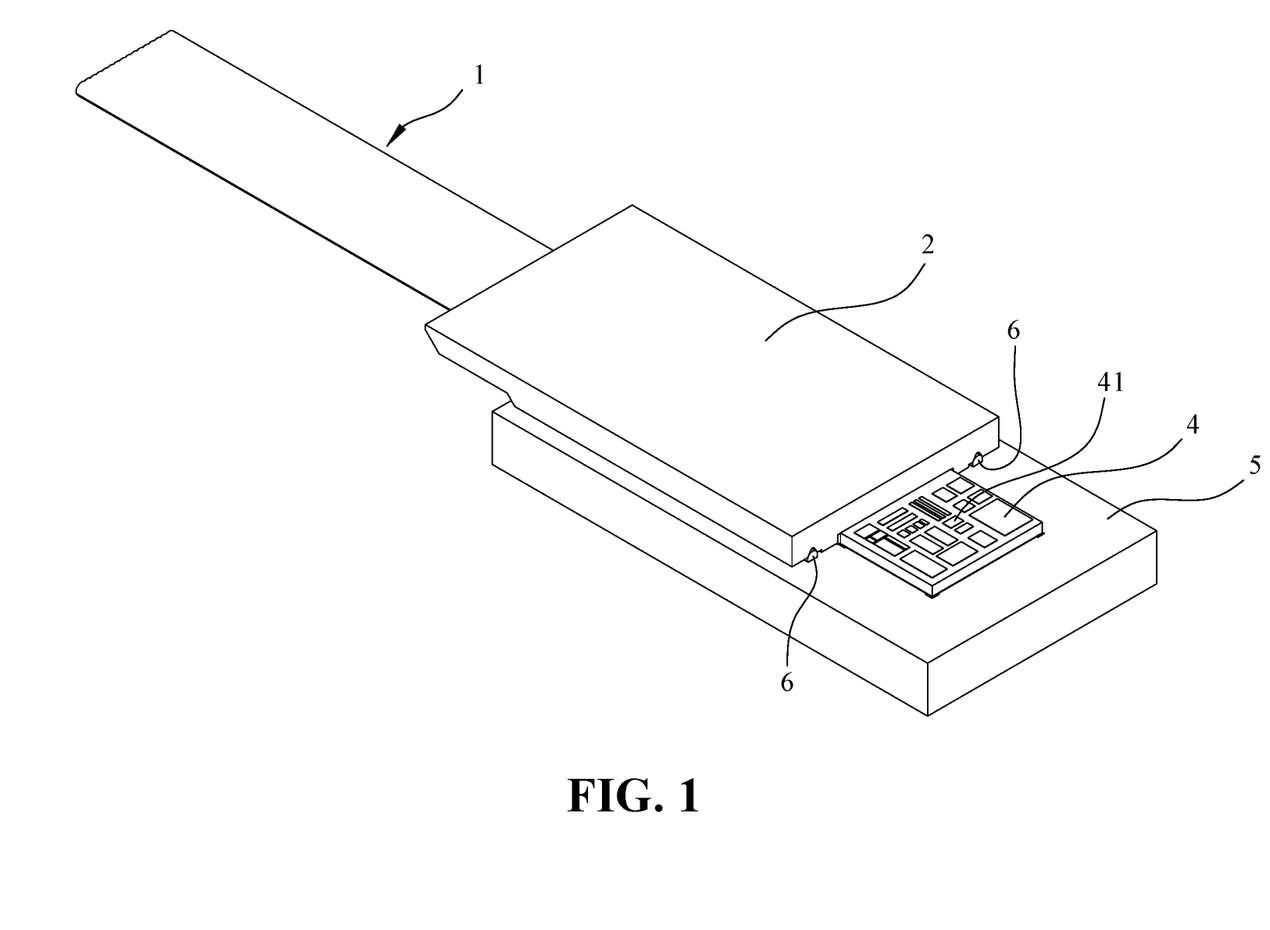
FIG. 1 is the perspective view of the first embodiment of the assembly alignment structure for optical component of the present invention.
Figure 2:
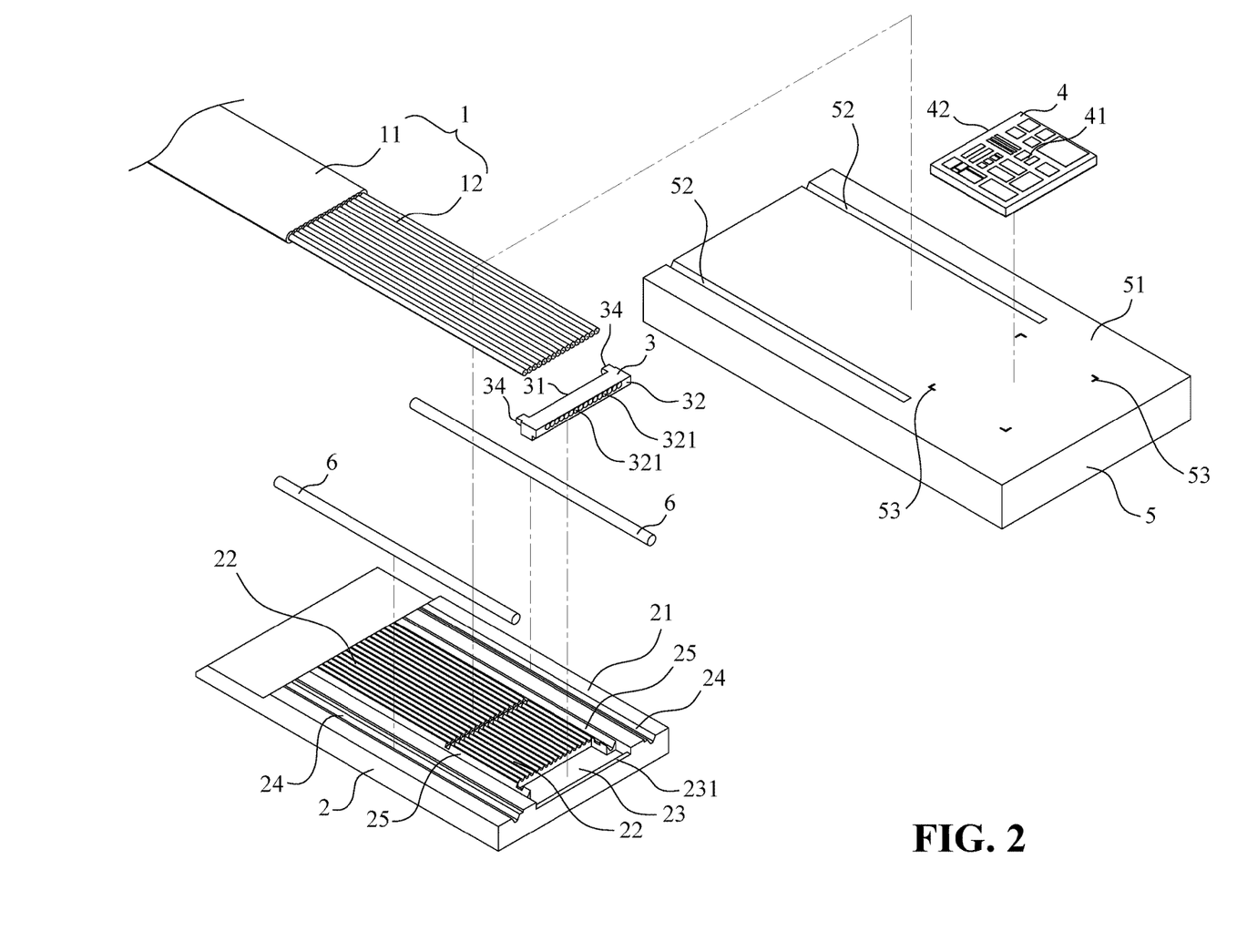
FIG. 2 is an exploded view of the first embodiment of the assembly alignment structure for optical component of the present invention.

FIG. 1 and FIG. 2 show a perspective view and an exploded view of the first embodiment of the present invention, respectively. The assembly alignment structure for optical component of the present invention includes an optical fiber 1, a cover plate 2, a lens 3, at least one chip 4, a carrier plate 5, and at least one positioning column 6. The optical fiber 1 includes a combined fiber segment 11 and a bare fiber segment 12. The cover plate 2 has a first installation surface 21, and the first installation surface 21 is disposed with a plurality of guide grooves 22, an installation groove 23 and at least one first coupling groove 24, and the bare fiber segment 12 is disposed in the corresponding guide groove 22. The lens 3 is mounted in the installation groove 23. The carrier plate 5 has a second installation surface 51. The second installation surface 51 is disposed with at least one second coupling groove 52 and a plurality of raised position marks 53, and the chip 4 is fixed to the area enclosed by the plurality of position marks 53. During assembly, when the cover plate 2 is aligned with the carrier plate 5, the positioning post 6 is located in the first coupling groove 24 and the second coupling groove 52, so that the optical fiber 1 and the lens 3 are accurately fixed between the carrier plate 5 and the cover plate 2, and the optical signal transmitted by the optical fiber 1 is received by the chip 4 after passing through the lens 3.

The following is a brief description on the structure and processing method of each component:

The optical fiber 1 is a single-mode or multi-mode optical fiber, including the combined fiber segment 11 with a protective layer on the periphery and the bare fiber segment 12 from which the protective layer has been removed. In the present embodiment, the bare fiber segment 12 is a light-emitting surface with a flat vertical end or angled end.

Figure 3:
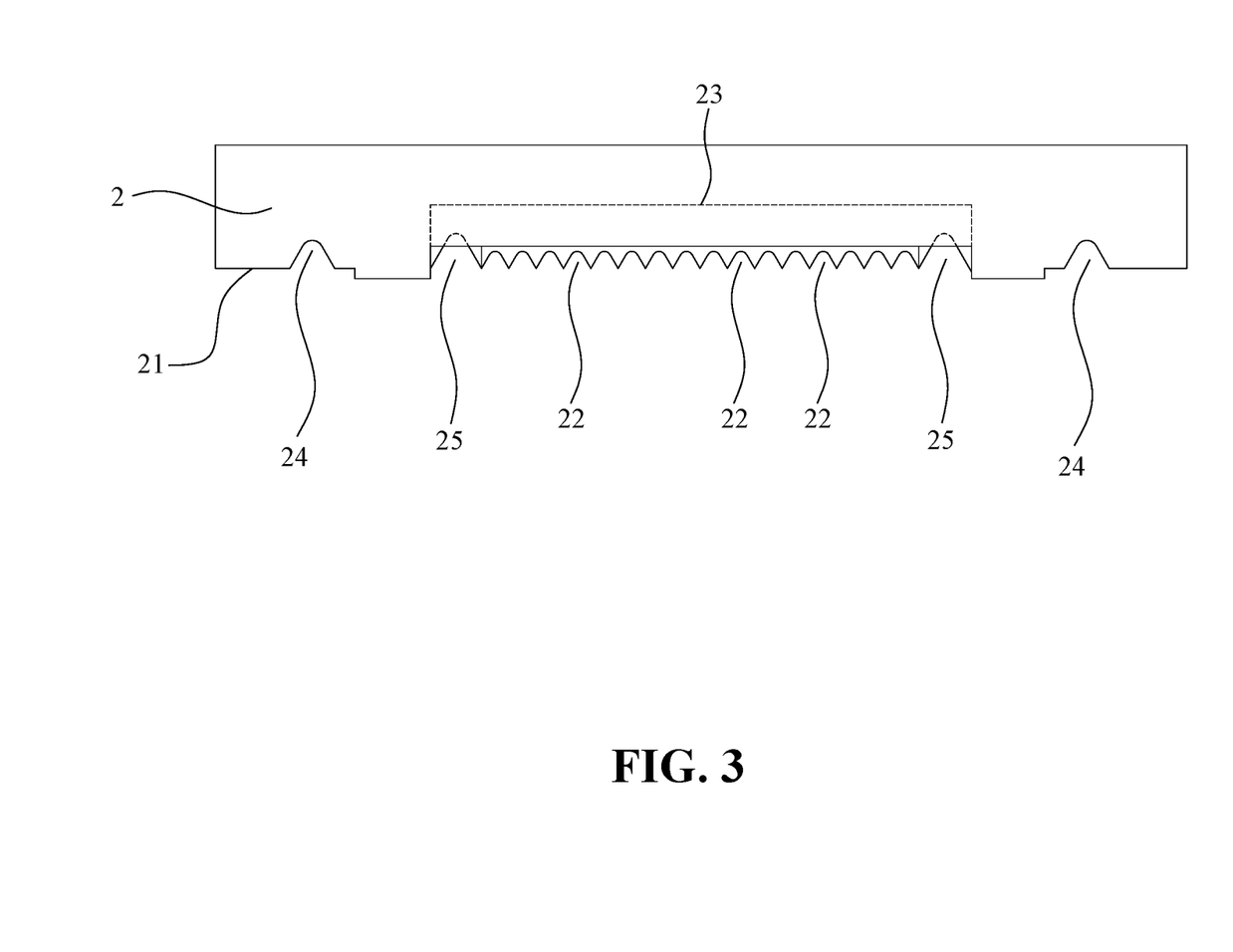
FIG. 3 is an enlarged planar view of the cover plate of the first embodiment of the assembly alignment structure for optical component of the present invention.
Figure 4:
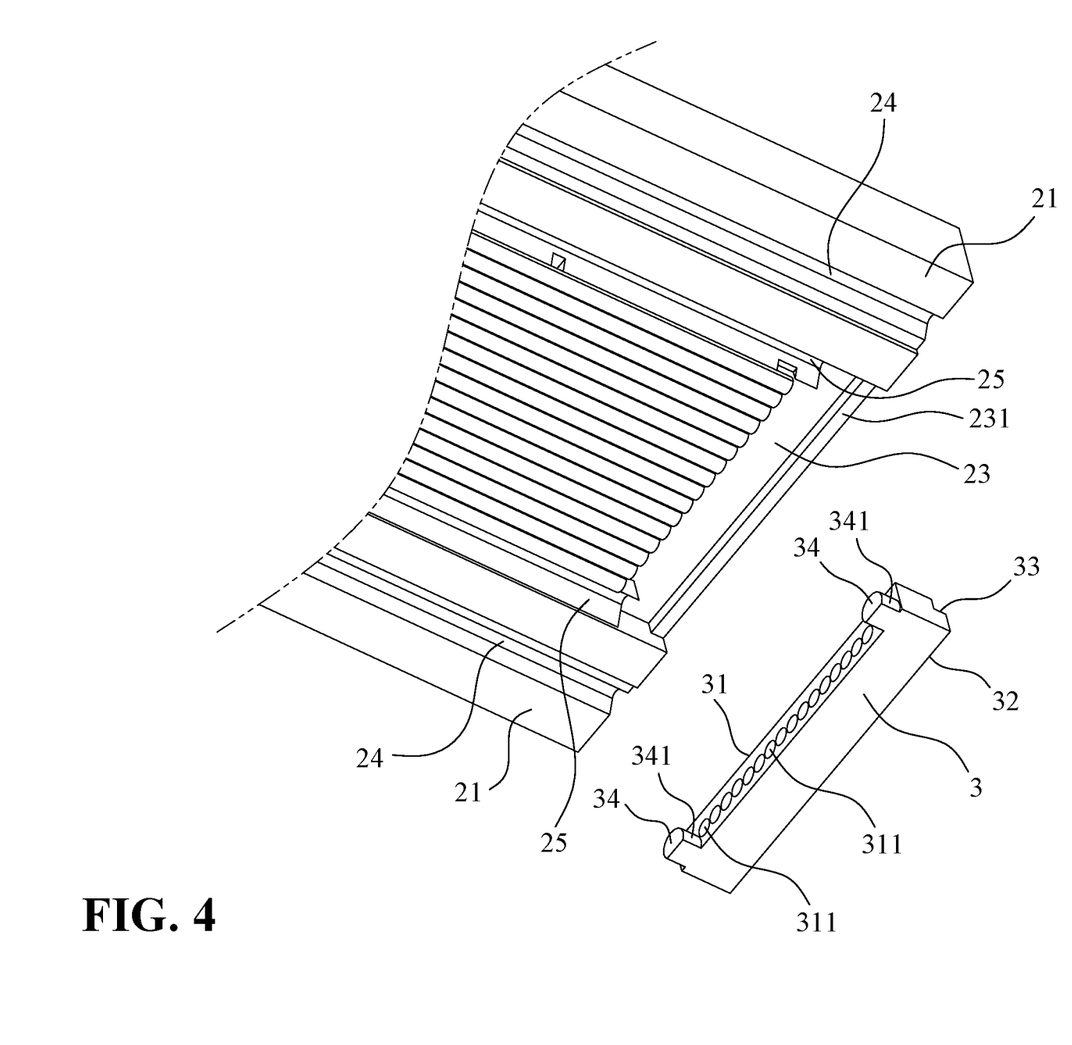
FIG. 4 is an exploded schematic view of a cover plate and a lens of the assembly alignment structure for optical component of the present invention.

The cover plate 2 is a plate body with the first installation surface 21. Refer to FIG. 3. The cross-sectional shape of the guide groove 22 is at least one of U-shaped or V-shaped. In the present embodiment, the guide groove 22 is a V-shaped groove. The size of a single guide groove 22 corresponds to the size of one bare fiber segment 12. The guide grooves 22 can precisely position the centers of a plurality of bare fiber segments 12 at the same horizontal position. In the present embodiment, the number of the first coupling grooves 24 is two, located on both sides of the guide grooves 22 and parallel to the guide grooves 22. The cross-sectional shape of the first coupling grooves 24 is at least one of a U-shape or a V-shape, and in the present embodiment, the first coupling groove 24 is a V-shaped groove. Refer to FIG. 4. The installation groove 23 is located at one end of the axial direction of the guide groove 22 and is adjacent to the vertical surface of the first installation surface 21. The installation groove 23 has a stepped groove shape and has an alignment plane 231. The first installation surface 21 further includes a plurality of alignment grooves 25, the alignment grooves 25 are adjacent to the two sides of the guide grooves 22 and communicate with the installation groove 23, and the alignment groove 25 is at least one of U-shaped or V-shaped. In the present embodiment, the alignment groove 25 is a V-shaped groove. The installation groove 23 is used to install the lens 3, and the alignment plane 231 and the alignment grooves 25 are used for calibrating and aligning the assembly position of the lens 3.

The lens 3 is used to effectively transmit optical signals to other optical elements, so the lens 3 can be at least one of a through-lens, a prism, etc., and the type is selected according to the application. In the present embodiment, the lens 3 is a through-lens. In the present embodiment, the lens 3 is elongated (i.e., a stripe shape) to correspond to a plurality of the bare fiber segments 12. Therefore, an optical fiber passive alignment surface 31 and an optical light-emitting surface 32 are respectively formed on two vertical side surfaces of the lens 3. The passive alignment surface 31 allows the optical signal provided by the bare fiber segment 12 to enter, then the light is refracted or passed through the lens 3, and finally output through the optical light-emitting surface 32. As shown in FIG. 2, in the present embodiment, the optical light-emitting surface 32 also forms a plurality of first convex lenses 321, each of which focuses an output light signal of the bare fiber segment 12, but the present invention is not limited thereto. As shown in FIG. 4, the surface of the optical fiber passive alignment surface 31 of the lens 3 may also have a plurality of second convex lenses 311, and each second convex lens 311 corresponds to one of the bare fiber segments 12. The design of lens 3 may choose to have a lens on only one side, for example, only the first convex lens 321, or two sets of lenses, such as the first convex lens 321 and the second convex lens 311, to ensure the output optical signal of the bare fiber segment 12 is refracted twice and then focused. In addition, for quick assembly and alignment, the lens 3 has an inlay 33 located on the side of the optical light emitting surface 32. The inlay 33 is used for contacting the alignment plane 231 during assembly to maintain and ensure the position of the optical light emitting surface 32. In addition, the lens 3 also has a plurality of guide posts 34 located on the side of the optical fiber passive alignment surface 31. The guide posts 34 form a circular arc surface 341 in the direction of the cover plate 2. During assembly, the lens 3 uses the guide post 34 to be located in the V-shaped alignment groove 25 with the arc surface 341, so that the position of the lens 3 is more accurately fixed there.

The chip 4 is an integrated circuit chip manufactured by a semiconductor process. In addition to the circuit 41 formed on the surface, one vertical surface of the chip 4 is a signal receiving surface 42. When the optical signal of the optical fiber 1 is projected onto the signal receiving surface 42, the optical signals can be converted into electrical signals for transmission or output through the related circuit of the chip 4.

The carrier plate 5 is a plate body, the second installation surface 51 is located on a flat surface of the carrier plate 5, and the second installation surface 51 is disposed with a plurality of the second coupling grooves 52 and a plurality of the position marks 53. The cross-sectional shape of the second coupling groove 52 is at least one of U-shaped or V-shaped. In the present embodiment, the second coupling groove 52 is a V-shaped groove, and the location and number of the second coupling groove 52 correspond to the first coupling groove 24 for the positioning post 6 to be disposed there. The position marks 53 are formed on the surface of the second installation surface 51. In the present embodiment, an L-shaped groove is formed, but the present invention is not limited thereto. The size of the enclosed area of the position marks 53 corresponds to the size of the chip 4. After the chip 4 is fixed to the carrier plate 5, it is convenient for personnel to confirm whether the position is offset. The chip 4 can be fixed on the carrier plate 5 by an adhesive, or using a flip chip technology to assist the fixing on the carrier plate 5 with tin balls or gold pads.

The manufacturing methods of the cover plate 2 and the carrier plate 5 may all use semiconductor processes, such as taking a general silicon wafer, pre-growing silicon dioxide/silicon nitride as a hard mask, and then spin coating photoresist. A photomask designed with a pattern corresponding to the size of the optical fiber is exposed on the photoresist. After developing and cleaning, the silicon dioxide hard mask is wet-etched with hydrofluoric acid (HF)/phosphoric acid ($H_3PO_4$), and the photoresist is cleaned and removed. The silicon in the area is exposed, and then the silicon is wet-etched by heating potassium hydroxide (KOH), and the etching anisotropy of KOH on the silicon surface is utilized to etch a smooth surface, so that the first installation surface 21 of the cover plate 2 can be etched to form a plurality of the V-shaped guide grooves 22, a plurality of the first coupling grooves 24, the installation groove 23, and the alignment groove 25, and the second installation surface 51 of the carrier plate 5 is etched to form a plurality of the second coupling groove 52 and a plurality of position marks 53. In addition, since the cover plate 2 and the carrier plate 5 are only responsible for positioning and assembling, the grade of silicon wafers used can be lower than the grade used to manufacture the chip 4, thereby reducing the cost. However, this is only one of the processing methods of the present invention, and is not limited thereto. For example, glass raw material can also be used for the cover plate 2 and the carrier plate 5, and then hot-pressed into the designed shape during the processing.

The positioning column 6 is used to quickly align the cover plate 2 and the carrier plate 5 when combining the two. In the present embodiment, the positioning column 6 is a cylinder, and the first coupling groove 24 and the second coupling groove 52 are both a V-shaped groove. The first coupling groove 24 and the second coupling groove 52 are manufactured by a semiconductor process, and the size and shape are precise. Therefore, when the cylinder of the positioning post 6 is located in the V-shaped groove first coupling groove 24 and the second coupling groove 52, the positioning post 6 can quickly ensure that the cover plate 2 and the carrier plate 5 are in the correct position, and the optical fiber 1, the lens 3, and the chip 4 are in the correct location with respect to one another.

The assembly alignment structure for optical component of the present invention is to simplify the assembly process and ensuring accurate alignment. The assembly method is that the bare fiber segment 12 of the optical fiber 1 is temporarily fixed in the guide groove 22 of the cover plate 2 with a light-curing glue, and the lens 3 is temporarily fixed in the installation groove 23 with a light-curing glue. The alignment plane 231 is in contact with the inlay surface 33, and the guide post 34 is in the alignment groove 25. The chip 4 is fixed to the area enclosed by the position marks 53 of the carrier plate 5, the positioning post 6 is placed in the second coupling groove 52, and the cover plate 2 is pressed down on the carrier plate 5. The positioning post 6 is located in the first coupling groove 24 and the second coupling groove 52, so that the cover plate 2 and the carrier plate 5 can be quickly and accurately aligned, which greatly shortens the previous calibration and alignment time. To improve the efficiency of assembly and alignment, the bonding of the two can also be partially coated with glue in advance. After bonding, UV-curing photo-curing glue is applied, so that the position of each element can be quickly and accurately fixed.

Figure 5:
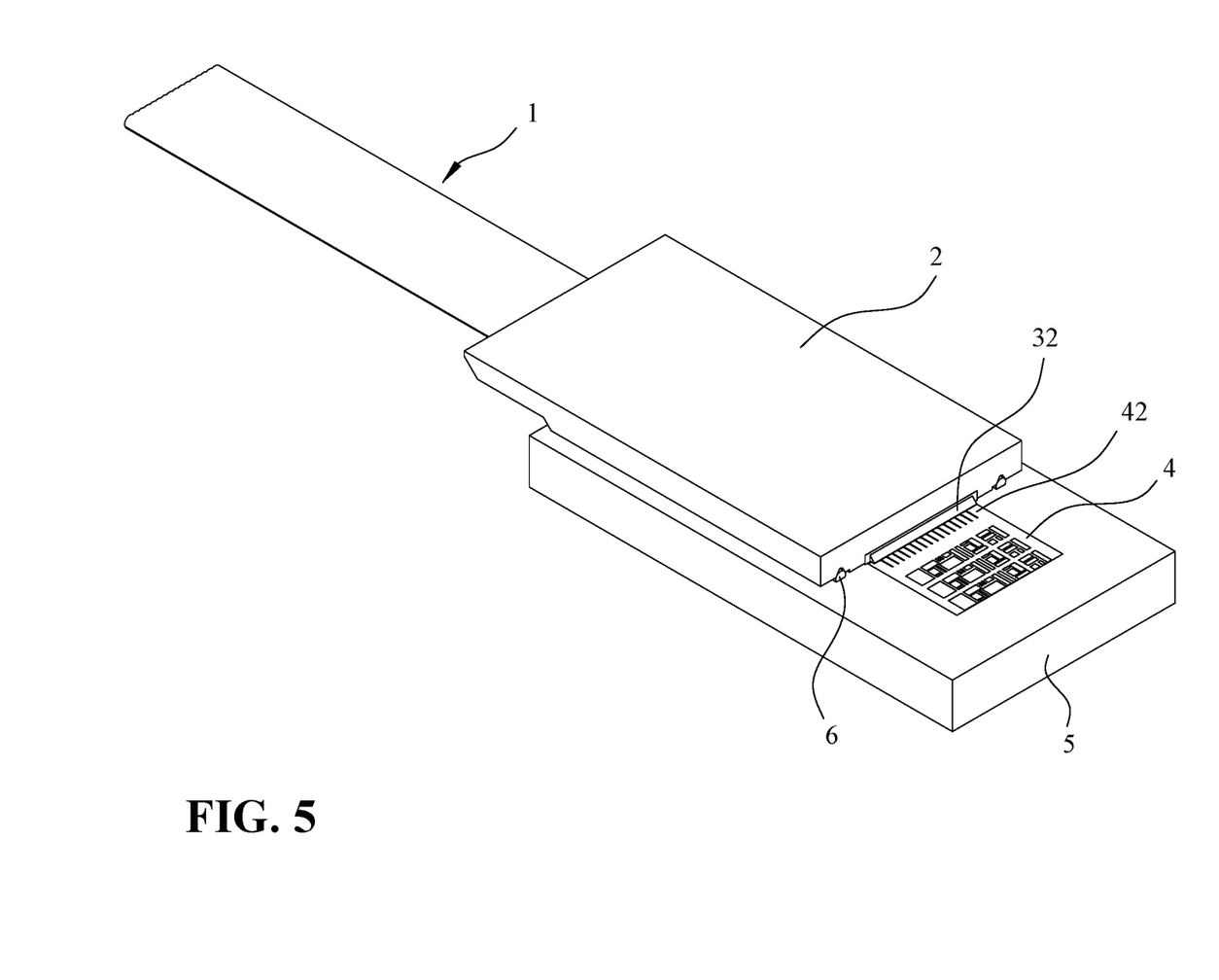
FIG. 5 is a perspective view of the second embodiment of the assembly alignment structure for optical component of the present invention.
Figure 6:
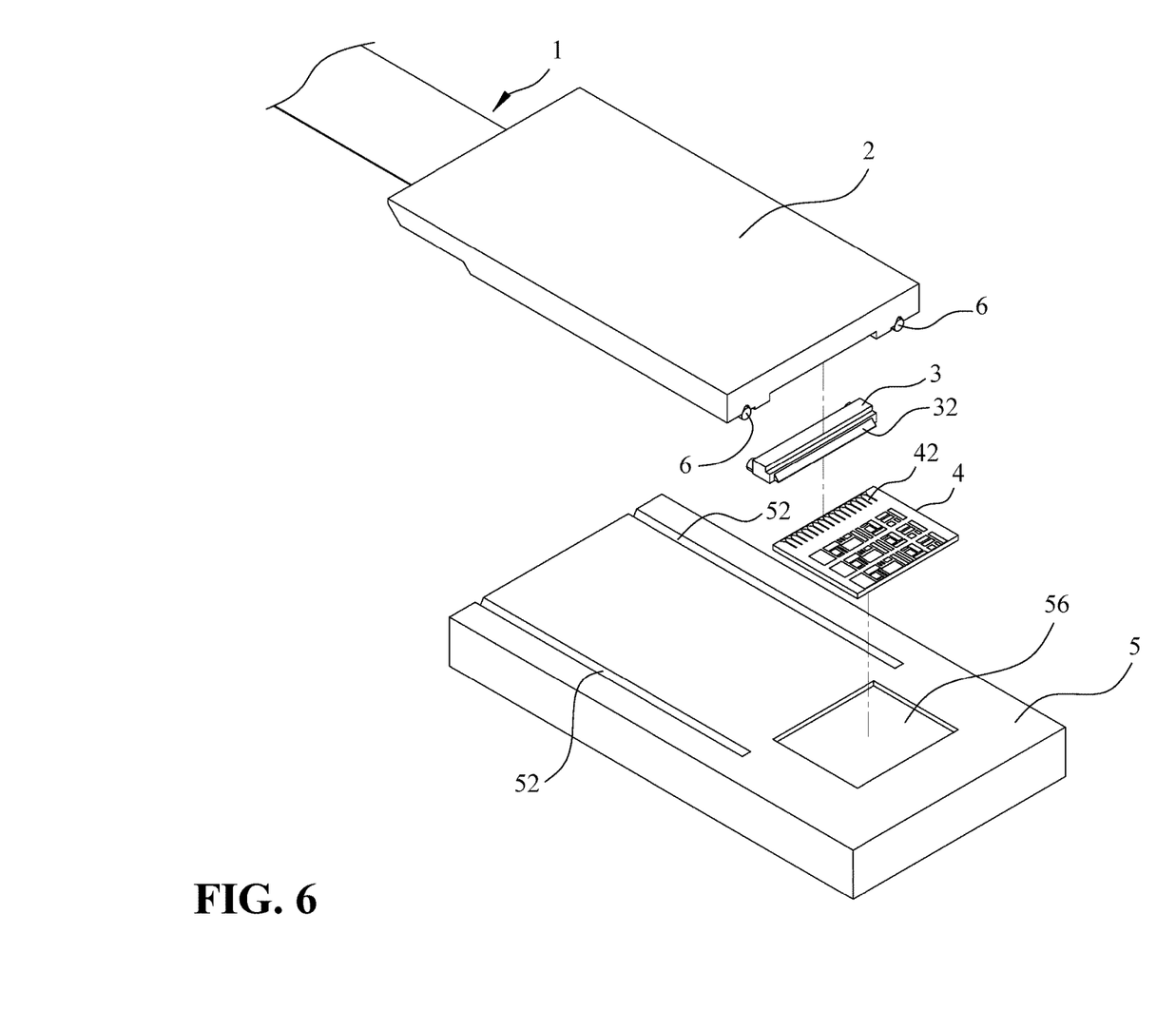
FIG. 6 is an exploded view of the second embodiment of the assembly alignment structure for optical component of the present invention.

As shown in FIG. 5 and FIG. 6, a perspective view and an exploded view of the second embodiment of the present invention are shown. The present embodiment is largely the same as the embodiment in FIG. 1, including the optical fiber 1, the cover plate 2, the lens 3, at least one chip 4, the carrier plate 5, and a plurality of positioning posts 6, so the details are omitted. The present embodiment differs in that some corresponding elements are changed according to the different specifications of the chip 4. In the present embodiment, the signal receiving surface 42 of the chip 4 faces upwards; accordingly, the optical light-emitting surface 32 of the lens 3 is inclined and is a reflective surface, and the carrier plate 5 has an accommodating groove 56, and the accommodating groove 56 enables the chip 4 to be embedded therein, so the output optical signal of the optical fiber 1 enters the interior of the lens 3 through the optical fiber passive alignment surface 31, gets reflected by the optical light-emitting surface 32 and then projected downward to the signal receiving surface 42 of the chip 4.

Figure 7:
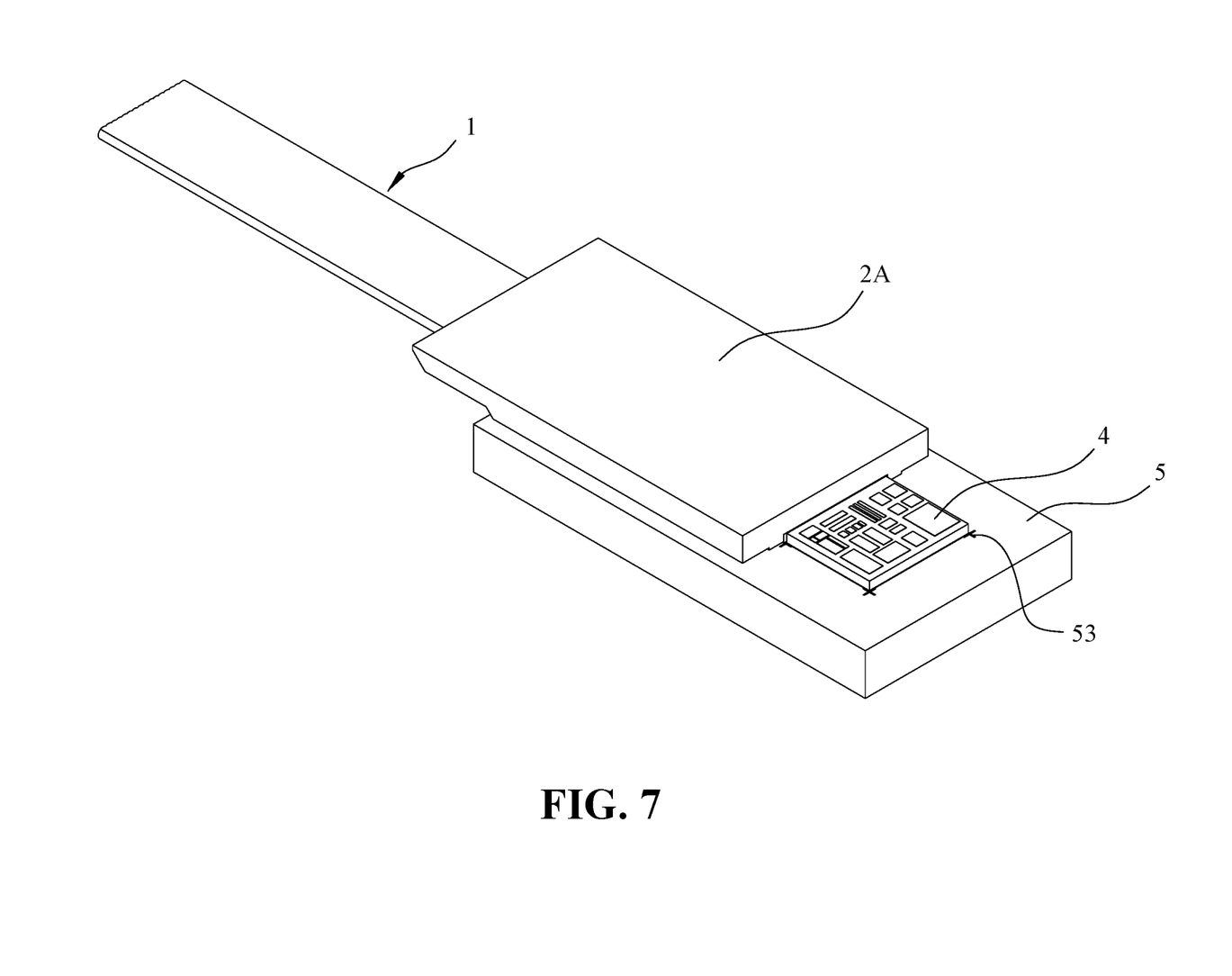
FIG. 7 is a perspective view of the third embodiment of the assembly alignment structure for optical component of the present invention.
Figure 8:
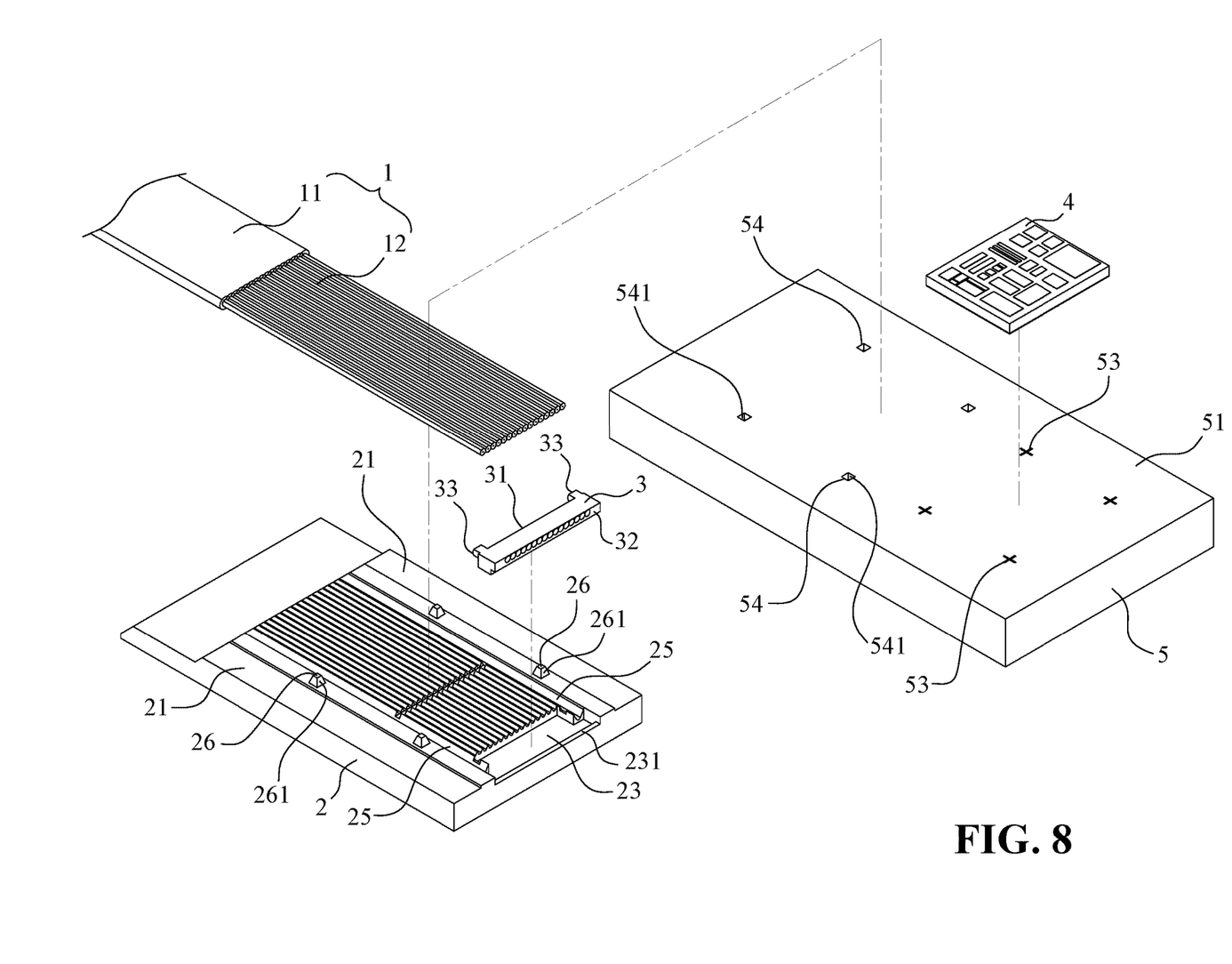
FIG. 8 is an exploded view of the third embodiment of the assembly alignment structure for optical component of the present invention.

FIG. 7 and FIG. 8 show a perspective view and an exploded view of the third embodiment of the present invention. In the present embodiment, there is no structure of the positioning column 6 described above, so the assembly alignment structure for optical component of the present invention includes an optical fiber 1, a cover plate 2, a lens 3, at least one chip 4, and a carrier plate 5, wherein the optical fiber 1, the lens 3, and the chip 4 are all the same as the embodiment in FIG. 1, so the description will be omitted. The present embodiment differs in that, while the cover plate 2 still has the first installation surface 21, the first installation surface 21 is disposed with a plurality of the guide grooves 22 and the installation groove 23, the first installation surface 21 is further provided with a plurality of first coupling portions 26. The carrier plate 5 still has the second installation surface 51, while the second installation surface 51 has a plurality of second coupling portions 54 in addition to the position marks 53 disposed thereon. When the cover plate 2 is aligned with the carrier plate 5, the first coupling portion 26 and the second coupling portion 54 are coupled and positioned with each other, and the optical fiber 1 and the lens 3 are fixed between the cover plate 2 and the carrier plate 5.

In the present embodiment, the first coupling portion 26 forms an upwardly convex positioning protrusion on the first installation surface 21 of the cover plate 2, and the positioning protrusion is a polygonal body or other shapes. The positioning protrusion has at least one side surface, and the side surface is an inclined surface 261, so as to facilitate the function of automatic positioning and calibrating during assembly. The second coupling portion 54 forms a downwardly concave positioning groove on the second installation surface 51 of the carrier plate 5. The positioning groove also has an inclined surface 541 at a corresponding position to match the position of the inclined surface 261 of the first coupling portion 26. The number, position, and shape of the first coupling portion 26 and the second coupling portion 54 correspond to each other.

In the above embodiment, the first coupling portion 26 is a positioning protrusion formed on the surface of the cover plate 2, and the second coupling portion 54 is formed on the surface of the carrier plate 5 with a downwardly concave positioning groove. However, the present invention is not limited thereto. The arrangement can also be changed to: the first coupling portion 26 is a positioning groove that is recessed downward on the surface of the cover plate 2, and the second coupling portion 54 is the upwardly raised positioning protrusion on the surface of the carrier plate 5.

During assembly, the chip 4 is first fixed in the area enclosed by the position marks 53 of the carrier plate 5. The optical fiber 1 and the lens 3 are fixed on the cover plate 2, and then the cover plate 2 is pressed down on the carrier plate 5. The first coupling portion 26 and the second coupling portion 54 are coupled and positioned with each other. The use of the inclined surface 261 and the inclined surface 541 to fit and slide face-to-face is more conducive to fast and accurate alignment, greatly shortens the previous calibration and alignment time, and improves the efficiency of assembly and alignment.

Figure 9:
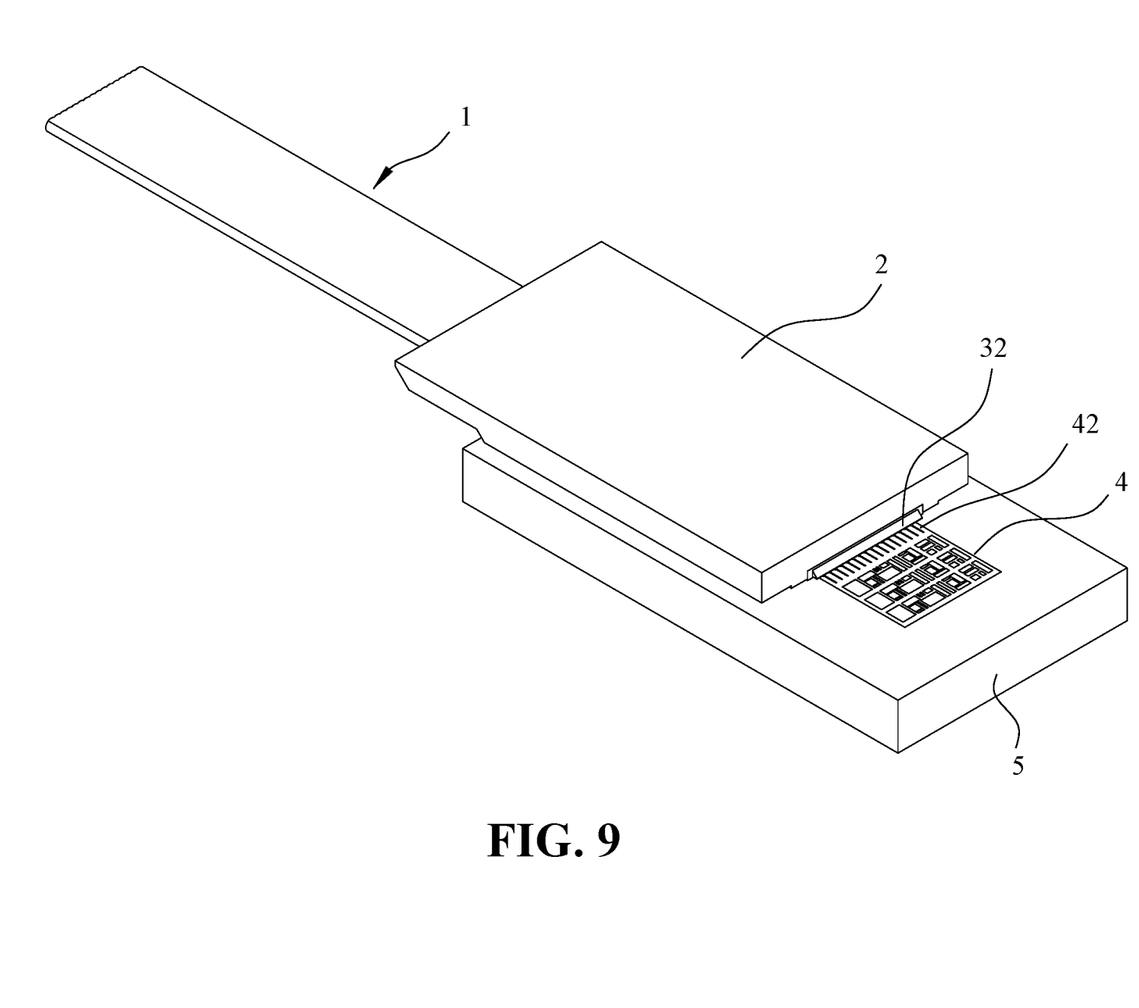
FIG. 9 is a perspective view of the fourth embodiment of the assembly alignment structure for optical component of the present invention.
Figure 10:
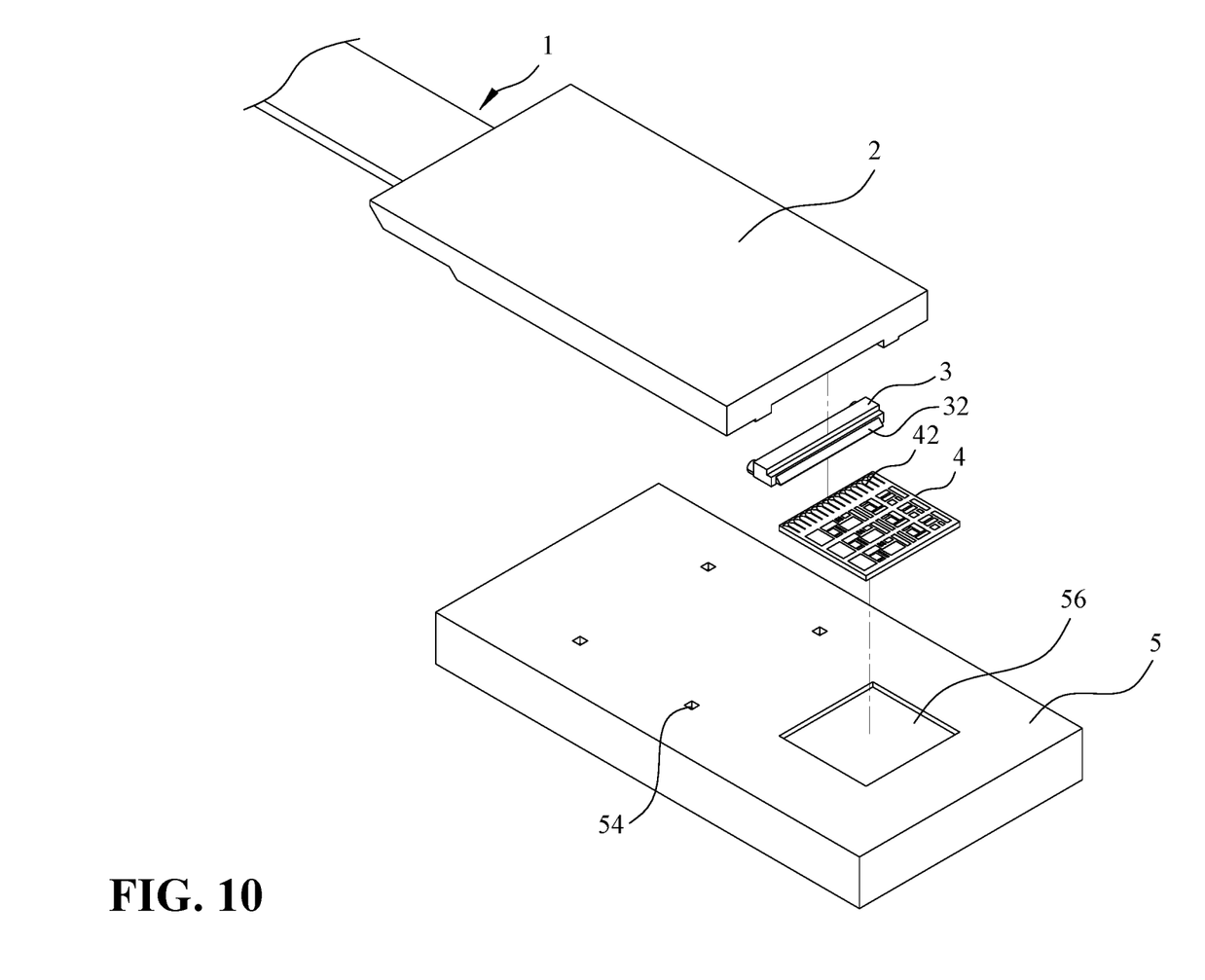
FIG. 10 is an exploded view of the fourth embodiment of the assembly alignment structure for optical component of the present invention.

FIG. 9 and FIG. 10 show a perspective view and an exploded view of the fourth embodiment of the present invention, respectively. The present embodiment is mostly the same as the embodiment in FIG. 7, including the optical fiber 1, the cover plate 2, the lens 3, the chip 4, and the carrier plate 5, and therefore the details are not repeated here. However, in the present embodiment, the corresponding elements are changed according to the different specifications of the chip 4. In the present embodiment, the signal receiving surface 42 of the chip 4 faces upwards, and the optical light-emitting surface 32 of the lens 3 is inclined and a reflective surface. The carrier plate 5 has an accommodating groove 56, and the accommodating groove 56 enables the chip 4 to be embedded therein, so that the optical signal output by the optical fiber 1 is transmitted through the optical fiber passive alignment surface 31 to enter the interior of the lens 3, and is then reflected by the optical light-emitting surface 32 and projected downward to the signal receiving surface 42 of the chip 4.

In summary, the assembly alignment structure for optical component of the present invention is to manufacture the chip 4, the cover plate 2, and the carrier plate 5 with materials of appropriate size, so that the cost of the components can be reduced. Through the cooperation of the first coupling groove 24, the second coupling groove 52, and the positioning post 6, or the cooperation of the first coupling portion 26 and the second coupling portion 54, the present invention allows the optical fibers to be positioned with respect to one another during assembly, so as to shorten the calibration alignment time, thereby improving assembly efficiency, which is in line with patent application requirements.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An assembly alignment structure for optical component, comprising:
   an optical fiber, comprising a combined fiber segment and a plurality of bare fiber segments;
   a cover plate, having a first installation surface, the first installation surface being disposed with a plurality of guide grooves corresponding to the plurality of bare fiber segments, an installation groove, and at least one first coupling groove, the bare fiber segments being arranged in the corresponding guide grooves;
   a lens, disposed in the installation groove;
   a chip, having a signal receiving surface;
   a carrier plate, having a second installation surface, the second installation surface being disposed with at least one second coupling groove, the chip being fixed on the second installation surface; and
   at least one positioning post;
   wherein, when the cover plate is aligned to cover the carrier plate, the positioning post is located in the first coupling groove and the second coupling groove, the optical fiber and the lens are accurately fixed between the carrier plate and the cover plate, and an optical signal of the optical fiber is projectable to the signal receiving surface through the lens.

2. The assembly alignment structure for optical component according to claim 1, wherein the first coupling groove and the second coupling groove are at least one of a V-shaped groove or a U-shaped groove, and the positioning post is a cylinder.

3. The assembly alignment structure for optical component according to claim 1, wherein the first installation surface forms a plurality of side-by-side recessed guide grooves at middle part, and the first coupling groove is formed at two sides of the guide grooves.

4. The assembly alignment structure for optical component according to claim 1, wherein the installation groove is a stepped groove, located at one axial end of the plurality of guide grooves, and adjacent to a vertical surface of one side of the first installation surface, the installation groove has an alignment plane, and the first installation surface also is disposed with a plurality of alignment grooves, the alignment grooves are adjacent to both sides of the plurality of guide grooves and communicate with the installation groove, and each of the alignment grooves is a V-shaped groove or a U-shaped groove.

5. The assembly alignment structure for optical component according to claim 4, wherein the lens has a stripe shape and corresponds to the plurality of the bare fiber segments, and an optical fiber passive alignment surface and an optical light-emitting surface are respectively formed on two vertical side surfaces of the lens, the optical fiber passive alignment surface faces the bare fiber segments, the lens has an inlay and located on the side of the optical light-emitting surface, the inlay is in contact with the alignment plane, and the lens also has a plurality of guide posts located on the side of the optical fiber passive alignment surface, and the guide posts are located in the alignment grooves.

6. The assembly alignment structure for optical component according to claim 5, wherein each of the alignment grooves is a U-shaped or V-shaped groove; each of the guide posts includes a partially arc surface located in a respective one of the alignment grooves.

7. The assembly alignment structure for optical component according to claim 5, wherein the second installation surface has an accommodating groove, the chip is located in the accommodating groove, the signal receiving surface of the chip faces upward, and the optical signal of the optical fiber is reflected by the optical light-emitting surface and then projected downward on the signal receiving surface.

8. The assembly alignment structure for optical component according to claim 1, wherein the second installation surface has a plurality of position marks, the chip is fixed in an enclosed area formed by the position marks, and a vertical surface of the chip has the signal receiving surface, and the optical signal of the optical fiber is directly projected on the signal receiving surface after being focused by the lens.

* * * * *